United States Patent [19]

Isaacson et al.

[11] Patent Number: 5,597,662

[45] Date of Patent: Jan. 28, 1997

[54] CURABLE SOLID ELECTROLYTES CONTAINING A MODIFIED VISCOSITY AGENT AND ELECTROLYTIC CELLS PRODUCED THEREFROM

[75] Inventors: Mark J. Isaacson, Santa Clara; Milton N. Golovin, San Jose, both of Calif.

[73] Assignee: Valence Technology, Inc., Henderson, Nev.

[21] Appl. No.: 511,299

[22] Filed: Aug. 4, 1995

Related U.S. Application Data

[63] Continuation of Ser. No. 74,107, Jun. 8, 1993, abandoned.

[51] Int. Cl.$^6$ .................................................. H01M 10/40
[52] U.S. Cl. ........................... 429/192; 29/623.4; 29/623.5
[58] Field of Search ............................ 429/192; 29/623.3, 29/623.4, 623.5, 208.2; 427/388.2, 58

[56] References Cited

U.S. PATENT DOCUMENTS

| | | | |
|---|---|---|---|
| 4,560,579 | 12/1985 | Siadat et al. | 427/208.2 X |
| 4,722,906 | 2/1988 | Guire | 436/501 |
| 4,908,283 | 3/1990 | Takahashi et al. | 429/192 |
| 4,973,493 | 11/1990 | Guire | 427/2 |
| 4,979,959 | 12/1990 | Guire | 623/66 |
| 5,006,431 | 4/1991 | Hope et al. | 429/192 |
| 5,022,582 | 3/1991 | Guire et al. | 623/66 |
| 5,030,527 | 7/1991 | Carpio et al. | 29/623.5 X |
| 5,040,791 | 8/1993 | Izuti et al. | 429/192 |
| 5,100,746 | 3/1992 | Muller et al. | 329/623.5 X |
| 5,127,205 | 12/1992 | Marchese et al. | 429/192 X |
| 5,232,795 | 8/1993 | Simon et al. | 424/192 |
| 5,238,758 | 8/1993 | Lee et al. | 429/192 X |

FOREIGN PATENT DOCUMENTS

| | | |
|---|---|---|
| 0078505 | 5/1983 | European Pat. Off. . |
| 0318161 | 5/1989 | European Pat. Off. . |
| 0372584 | 6/1990 | European Pat. Off. . |
| 0425255 | 5/1991 | European Pat. Off. . |
| 0492858 | 1/1992 | European Pat. Off. . |
| 0499115 | 8/1992 | European Pat. Off. . |
| 0537930 | 4/1993 | European Pat. Off. . |
| 2632455 | 8/1989 | France . |
| 2640801 | 6/1990 | France . |
| WO94/02662 | 2/1994 | WIPO . |
| WO94/02967 | 2/1994 | WIPO . |
| WO94/02454 | 2/1994 | WIPO . |

OTHER PUBLICATIONS

Dunkirk et al., "Surface–Modification of Polymers for Increased Wettability," presented at Annual Meeting of Soc. for Biomaterial 1989 (Apr. 28–May 2).

Clapper et al., "Hirudin Immobilization to Produce Antithrombic Surfaces," *Cardiovascular Science and Technology: Basic and Applied*, KY.(1990) (Dec.).

Dunkirk et al., "Contact Lens Coatings for Increased Wettability and Reduced Deposits and Bacterial Colonization," presented at Annual Meeting for Soc. for Biomaterial 1990.(May).

Clapper et al., "Covalent Immobilization of Cell Adhesion Proteins and Peptides to Promote Cell Attachment and Growth on Biomaterials," presented at Annual Meeting of Soc. for Biomaterial 1991 (May 1–5).

Clapper et al., "Covalent Immobilization of Extracellular Matrix Peptides to Promote Cell Attachment and Growth on Biomaterials," presented at Annual Meeting for Soc. for Biomaterial 1991. (May 1–5).

Amos et al., "Surface Modification of Polymers by Photochemical Immobilization—A General Method," presented at Annual Meeting of Soc. for Biomaterial 1991. (May 5).

Colby et al., "Light Activated Polymers for Flexible Surface Modification," *Proceedings of the Medical Design & Manufacturing Conference*, N.Y. (1992) (Jun. 3).

*Primary Examiner*—Stephen Kalafut
*Attorney, Agent, or Firm*—Charles Jew

[57] ABSTRACT

This invention is directed to a solid electrolyte containing a polymeric matrix, a salt, a solvent and a viscosifying agent containing a reactive group as well as electrolytic cells prepared from such solid electrolytes.

22 Claims, No Drawings

CURABLE SOLID ELECTROLYTES CONTAINING A MODIFIED VISCOSITY AGENT AND ELECTROLYTIC CELLS PRODUCED THEREFROM

This application is a continuation of application Ser. No. 08/074,107, filed Jun. 8, 1993, now abandoned.

BACKGROUND OF THE INVENTION

1. Field of the Invention

This invention is directed to solid electrolytes containing a modified viscosifying agent and, in particular, solid electrolytes containing a polymeric matrix, a salt, a solvent and a viscosifying agent containing a reactive group, preferably a photochemically or thermochemically reactive group.

This invention is further directed to solid electrolytic cells (batteries) containing an anode, a cathode and a solid electrolyte containing a viscosifying agent containing a reactive group, preferably a photochemically or thermochemically reactive group.

2. State of the Art

Electrolytic cells containing an anode, a cathode and a solid, solvent-containing electrolyte incorporating a salt are known in the art and are usually referred to as "solid batteries". These cells offer a number of advantages over electrolytic cells containing a liquid electrolyte (i.e., "liquid batteries") including improved safety features. Notwithstanding their advantages, the manufacture of these solid batteries requires careful process controls to maximize the adherence of the various layers during formation of the electrolytic cells. Poorly adhered laminates can inhibit battery performance and can significantly reduce charge and discharge capacity.

Specifically, solid batteries employ a solid electrolyte interposed between a cathode and an anode. The solid electrolyte contains either an inorganic or an organic matrix and a suitable salt, such as an inorganic ion salt, as a separate component. The inorganic matrix may be non-polymeric, e.g., β-alumina, silver oxide, lithium iodide, and the like, or polymeric, e.g., inorganic (polyphosphazene) polymers, whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(O)O-$ where $R'$ is hydrogen or a lower alkyl of from 1–6 carbon atoms.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte containing a polymeric matrix suffer from low ion conductivity and, accordingly, in order to maximize the conductivity of these materials, the matrix is generally constructed into a very thin film, i.e., on the order of about 25 to about 250 μm. As is apparent, the reduced thickness of the film reduces the total amount of internal resistance within the electrolyte thereby minimizing losses in conductivity due to internal resistance.

The solid electrolytes also contain a solvent (plasticizer) which is typically added to the matrix primarily to increase the conductivity of the electrolytic cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like.

The solid, solvent-containing electrolyte has typically been formed by one of two methods. In one method, the solid matrix is first formed and then a requisite amount of this material is dissolved in a volatile solvent. Requisite amounts of a salt, such as an inorganic ion salt, and the electrolyte solvent (typically a glyme compound and an organic carbonate) are then added to the solution. This solution is then placed on the surface of a suitable substrate, e.g., the surface of a cathode, and the volatile solvent is removed to provide for the solid electrolyte.

In the other method, a monomer or partial polymer of the polymeric matrix to be formed is combined with appropriate amounts of the salt and the solvent. This mixture is then placed on the surface of a suitable substrate, e.g., the surface of the cathode, and the monomer is polymerized or cured (or the partial polymer is then further polymerized or cured) by conventional techniques (heat, ultraviolet radiation, electron beams, and the like) so as to form the solid, solvent-containing electrolyte.

When the solid electrolyte is formed on a cathodic surface, an anodic material can then be laminated onto the solid electrolyte to form a solid battery, i.e., an electrolytic cell.

Regardless of which of the above techniques is used in preparing the solid electrolyte, an area of investigation relates to the mechanical properties of the solid electrolyte. Typically, a vicosifying agent is added to the solid electrolyte to enhance the thickening and wettability of the various components. After curing, the viscosifying agent functions as a filler in the electrolyte. However, the viscosifying agent is not covalently bonded to any of the other components. Thus, the electrolyte layer is not a relatively mechanically strong layer of the electrolytic cell laminate. Moreover, the cathode and electrolyte layers are relatively slippery and do not readily adhere to each other.

In view of the above, the art is searching for methods to improve solid electrolyte manufacture as well as to increase the adherence of the laminate layers of solid batteries employing such electrolytes.

SUMMARY OF THE INVENTION

The present invention is directed, in part, to the discovery that the use of a viscosifying agent containing a latent reactive group as a component of the solid, solvent-containing electrolyte provides for several benefits to the solid electrolyte manufacturing process as well as to the solid battery itself. In particular, the present invention provides for a solid, solvent-containing electrolyte wherein the viscosifying agent is covalently bonded to other components of the electrolyte and provides for an electrolyte layer having improved mechanical properties. The resultant improved electrolyte layer also provides for enhanced adherence to the cathode and/or anode layer.

By covalently bonding the components within the electrolyte, a major source of structural integrity of the electrolyte is achieved. In this manner, a solid electrolyte having improved mechanical properties is provided.

Further, an electrolytic cell having improved mechanical properties is also provided. Covalent bonding of the electrolyte to the cathode and/or anode improves the mechanical properties of the electrolytic cell. Electrolytic cell manufacturing procedures are also improved since laminate adherence is improved.

Moreover, the covalent bonding of the modified viscosifying agent to other components of the electrolyte or electrolytic cell of the present invention does not detrimentally affect the battery performance.

Accordingly, in one of its composition aspects, the present invention is directed to an electrolyte precursor for an electrolytic cell which comprises:

a solid matrix forming monomer;
a salt;
a solvent; and
a viscosifying agent containing a latent reactive group.

In another of its composition aspects, the present invention is directed to a solid, single-phase, solvent-containing electrolyte which comprises:

a solid polymeric matrix;
a salt;
a solvent; and
a viscosifying agent containing a reactive group, wherein said viscosifying agent is covalently bonded to other components of the electrolyte.

In another of its composition aspects, the present invention is directed to an electrolytic cell which comprises:

an anode containing a compatible anodic material;
a cathode containing a compatible cathodic material; and
interposed therebetween a solid, solvent-containing electrolyte which comprises:
    a solid polymeric matrix;
    a salt;
    a solvent; and
    a viscosifying agent containing a reactive group,
wherein said viscosifying agent is covalently bonded to other components of the electrolyte.

In one of its method aspects, the present invention is directed to a process for preparing a solid electrolyte precursor for an electrolytic cell which comprises:

(a) providing an electrolyte composition comprising:
    a solid matrix forming monomer,
    a salt,
    a solvent, and
    a viscosifying agent containing a latent reactive group;

(b) curing said electrolyte precursor composition so as to activate the latent reactive group to covalently bond to other components of the electrolyte to provide a solid electrolyte.

In another of its method aspects, the present invention is directed to a process for preparing a solid electrolyte for an electrolytic cell which comprises:

(a) polymerizing a solid martrix forming monomer to form a solid polymeric matrix;

(b) dissolving said solid polymeric matrix in a suitable volatile solvent;

(c) adding a salt, a suitable electrolyte solvent and a viscosifying agent containing a latent reactive group to the dissolved polymeric matrix to form an electrolyte composition; and (d) removing said volatile solvent and curing said electrolyte composition so as to activate the latent reactive group to covalently bond to other components of the electrolyte to provide a solid electrolyte.

In another of its method aspects, the present invention is directed to a process for preparing an electrolytic cell which comprises:

(a) providing a cathode containing a compatible cathodic material;

(b) coating a surface of the cathode with an electrolyte precursor composition comprising:
    a solid matrix forming monomer,
    a salt,
    a solvent, and
    a viscosifying agent containing a latent reactive group;

(c) curing said electrolyte composition so as to activate the reactive group to covalently bond the viscosifying agent to other components of the electrolyte to provide a solid electrolyte precursor covalently bonded to the cathodic surface; and (d) laminating an anode containing a compatible anodic material to said solid electrolyte such that the solid electrolyte is interposed between the anode and the cathode.

In another of its method aspects, the present invention is directed to a process for preparing an electrolytic cell which comprises:

(a) providing an anode containing a composite anodic material;

(b) coating a surface of the anode with an electrolyte composition comprising:
    a solid matrix forming monomer,
    a salt,
    a solvent, and
    a viscosifying agent containing a latent reactive group;

(c) curing said electrolyte composition so as to activate the reactive group to covalently bond the viscosifying agent to other components of the electrolyte to provide a solid electrolyte covalently bonded to the anodic surface; and (d) laminating an cathode containing a compatible cathodic material to said solid electrolyte such that the solid electrolyte is interposed between the anode and the cathode.

In another of its method aspects, the present invention is directed to a process for preparing an electrolytic cell which comprises:

(a) providing an anode containing a composite anodic material;

(b) providing a cathode containing a compatible cathodic material;

(c) interposing between surfaces of the cathode and the anode an electrolyte precursor composition comprising:
    a solid matrix forming monomer,
    a salt,
    a solvent, and
    a viscosifying agent containing a latent reactive group; and (d) curing said electrolyte composition so as to activate the reactive group to covalently bond the viscosifying agent to other components of the electrolyte to provide a solid electrolyte covalently bonded to the surfaces of both the anode and cathode.

DETAILED DESCRIPTION OF THE PREFERRED EMBODIMENTS

As noted above, this invention is directed to solid electrolytes containing a polymeric matrix, a salt, a solvent and a viscosifying agent containing a reactive group, preferably a photochemically or thermochemically reactive group, and solid electrolytic cells made therefrom. By virtue of the modified viscosifying agent employed, the viscosifying agent is covalently bonded to other components of the electrolyte and provides for an electrolyte layer having improved mechanical properties. The resultant improved electrolyte layer also provides for enhanced adherence to the cathode and/or anode layer. However, prior to describing this invention in further detail, the following terms are defined below.

Definitions

As used herein, the following terms have the following meanings.

The term "solid polymeric matrix" refers to an electrolyte compatible material formed by polymerizing an inorganic or organic monomer (or partial polymer thereof) and which, when used in combination with the other components of the electrolyte, renders the electrolyte solid. The solid matrix may or may not be ion-conducting.

Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. Preferably, the solid matrix forming monomers have at least one heteroatom capable of forming donor acceptor bonds with inorganic cations (e.g., alkali ions). When polymerized, such compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. patent application Ser. No. 07/918,438, filed Jul. 22, 1992, and entitled "SOLID ELECTROLYTES DERIVED BY POLYMERIZATION OF VINYL SULFONATE POLYALKYLENE OXIDES" now U.S. Pat. No. 5,262,253 which application is incorporated herein by reference in its entirety), and the like as well as mixtures thereof.

Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of an organic carbonate and a glyme compound, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and modified viscosifying agent. For example, a composition comprising requisite amounts of the solid matrix forming monomer, inorganic ion salt, organic carbonate/glyme solvent and modified viscosifying agent can be applied to a substrate and then cured. Alternatively, the solid matrix forming monomer can be first cured and then dissolved in a suitable volatile solvent. Requisite amounts of the inorganic ion salt, organic carbonate/glyme solvent and modified viscosifying agent can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature. Accordingly, the solid electrolyte of this invention does not include a separator as is typical of liquid electrolytes.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, and the like. Specific examples of suitable inorganic ion salts include $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$ and the like. The inorganic ion salt preferably contains at least one atom selected from the group consisting of Li, Na, K, Cs, Rb, Ag, Cu and Mg.

The term "organic carbonate" refers to hydrocarbyl carbonate compounds of no more than about 12 carbon atoms and which do not contain any hydroxyl groups. Preferably, the organic carbonate is a linear aliphatic carbonate and most preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro(1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety.

Additional suitable cyclic aliphatic carbonates are disclosed in U.S. Pat. No. 4,747,850 which is also incorporated herein by reference in its entirety.

In a more preferred embodiment, linear aliphatic carbonates are represented by the formulae:

$$R_{14}[OC(O)]_tOR_{15} \text{ and } R_{14}[OC(O)R_{16}]_uOC(O)R_{15}$$

where each $R_{14}$ and $R_{15}$ are independently selected from the group consisting of alkyl of from 1 to 4 carbon atoms; $R_{16}$ is an alkylene group of from 2 to 4 carbon atoms; t is an integer of from 1 to 2, and u is an integer from 1 to 4.

Most preferably, the linear aliphatic carbonate is a carbonate of the formula:

$$R_{14}[OC(O)]_tOR_{15}$$

where $R_{14}$, $R_{15}$ and t are as defined above.

Linear aliphatic carbonates are well known in the art and a variety of which are commercially available. Additionally, the linear aliphatic carbonates can be prepared by transesterification of a suitable alcohol (e.g., $R_{14}OH$ and $R_{15}OH$) with, e.g., diethyl carbonate under transesterification conditions.

The term "modified viscosifying agent" refers to a suitable viscosifying agent for solid electrolytes, which agent has been modified by the attachment thereto of a latent reactive group, preferably a photochemically or thermochemically reactive group. Modified viscosifying agents suitable for use in the present invention can be prepared according to the methods and procedures disclosed in U.S. Pat. Nos. 5,002,582; 4,979,959; 4,973,493 and 4,722,906 which are incorporated herein by reference in their entirety.

Viscosifying agents include conventional viscosifying agents such as those known to one of ordinary skill in the art. Suitable viscosifying agents include, for example, polyethylene oxide, polypropylene oxide, and copolymers thereof, polyvinylpyrrolidone, carboxymethylcellulose, and the like.

Latent reactive groups are those groups which respond to specific applied external stimuli to undergo active specie generation with resultant covalent bonding to adjacent molecules. Latent reactive groups are those groups of atoms in a molecule which retain their covalent bonds unchanged under conditions of storage but which, upon activation, form covalent bonds with other molecules. The latent reactive groups generate active species such as free radicals, nitrenes, carbenes, and excited states of ketones upon absorption of external electromagnetic or kinetic (thermal) energy. Latent reactive groups may be chosen to be responsive to various portions of the electromagnetic spectrum, and latent reactive groups that are responsive to ultraviolet, visible or infrared portions of the spectrum are preferred. Most preferred are photochemically or thermochemically reactive groups. For example, a viscosifying agent having such a latent reactive group, when activated, attaches to other components of the electrolyte by forming a covalent bond between the reactive group and the other components.

Photochemically reactive groups are those groups which are activated by radiation and include, for example, aryl, alkyl, and acyl azides, oxazidines, isocyanates, alkyl and 2-ketodiazo derivatives of diazirines, aromatic ketones, aromatic diazonium derivatives and numerous classes of carbonium ion and radical generators.

Thermochemically reactive groups are those groups which are activated by heat energy and include, for example, nitrophenylhalides, alkylamino, alkylcarboxyl, alkythiol, alkylaldehyde, alkylmethylimidate, alkylisocyanate, alkylisothiocyanate and alkylhalide groups.

The term "electrolytic cell" refers to a composite containing an anode, a cathode and an ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys such as alloys of lithium with aluminum, mercury, tin, zinc, and the like, and intercalation based anodes such as carbon, tungsten oxides and the like.

The cathode is typically comprised of a compatible cathodic material, i.e., insertion compounds, which is any material which functions as a positive pole in a solid electrolytic cell. Such compatible cathodic materials are well known in the art and include, by way of example, manganese oxides, molybdenum oxides, vanadium oxides, sulfides of titanium and niobium, lithiated cobalt oxides, lithiated manganese oxides, chromium oxides, copper oxides, and the like. The particular compatible cathodic material employed is not critical.

In one preferred embodiment, the compatible cathodic material is mixed with an electroconductive material including, by way of example, graphite, powdered carbon, powdered nickel, metal particles, electronically conductive polymers, i.e., characterized by a conjugated network of double bonds like polypyrrole, polyacetylene, polyaniline and polythiophene and the like, and a binder, such as a polymeric binder, to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:10 (w/w) mixture of an organic carbonate and a glyme; and from about 5 weight percent to about 30 weight percent of a solid matrix forming monomer or partial polymer thereof. (All weight percents are based on the total weight of the cathode.)

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art, some of which are commercially available. A particularly preferred current collector for the cathode is a roughened nickel (electrolytically deposited nickel) on nickel current collector (available as CF18/NiT from Fukuda Metal Foil & Powder Company, Ltd., Kyoto, Japan). The current collectors are preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent and the cathode solvent are identical.

Methodology

Methods for preparing solid, solvent-containing electrolytes are well known in the art. In one embodiment, however, this invention utilizes a particular solvent (plasticizer) mixture in the preparation of solid electrolytes which solvent mixture provides improvements in electrolyte manufacture and economics.

As noted above, organic carbonates are either commercially available or can be prepared by art recognized methods. For example, the preparation of $RO(CR_3R_4CR_3R_4)_pOH$ compounds, where R, $R_3$, $R_4$, and p are as defined above, can be readily prepared by reaction of an ethylene oxide derivative (an oxide derived from $CR_3R_4=CR_3R_4$ by conventional methods) with ROH under polymerization conditions. See, for example, U.S. Pat. No. 4,695,291 which is incorporated herein by reference in its entirety.

Careful control of the stoichiometry, e.g., 3 moles of the ethylene oxide derivative to 1 mole of ROH when p=3, and reaction conditions will result in formation of a mixture of oligomers of the formula $RO(CR_3R_4CR_3R_4O)_pOH$ wherein the mixture will contain a substantial amount of the trimer (p=3) as well as other oligomers such as the dimer and tetramer etc. (i.e., p=2, p=4, etc.). The trimer can then be separated from the reaction mixture by conventional methods including distillation, column chromatography, high performance liquid chromatography (HPLC), and the like. The resulting hydroxyterminated oligomers are then reacted with an organometallic compound such as t-butyl lithium to form the corresponding glyme derivative.

In addition to the glyme derivative, the solvent can include a glyme formed by alkylation of an alkylene glycol(ether). Such alkylation can be readily accomplished by known methods including, by way of example, treatment of the alkylene glycol(ether) with metallic sodium followed by addition of RCl, where R is as defined above.

The solid, solvent-containing electrolyte can be preferably prepared by combining, for example, a solid matrix-forming monomer with an inorganic ion salt, the solvent mixture of an organic carbonate and a glyme and a viscosifying agent containing a latent reactive group. The resulting composition can then be uniformly coated onto a suitable substrate, e.g., aluminum foil, a glass plate, a lithium anode, a cathode, interposed between an anode and a cathode, and the like, by means of a roller, a doctor blade, a bar coater, a silk screen or spinner to obtain a film of this composition or its solution prior to curing. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns ($\mu$m). More preferably, the solid, solvent-containing electrolyte may have a thickness of from about 20 to about 250 microns. The final thickness will depend on the particular application.

The electrolyte composition typically comprises from about 5 to about 25 weight percent salt, based on the total weight of the electrolyte; preferably, preferably from about 10 to 20 weight percent; and even more preferably from about 10 to about 15 weight percent.

The electrolyte composition typically comprises from about 40 to about 80 weight percent solvent, based on the total weight of the electrolyte; preferably from about 60 to about 80 weight percent; and even more preferably about 70 weight percent.

The solid electrolyte composition typically comprises from about 5 to about 30 weight percent of solid polymeric matrix, based on the total weight of the electrolyte; preferably from about 15 to about 25 weight percent.

The solid electrolyte composition further comprises from about 1 to about 15 weight percent of a viscosifying agent containing a reactive group, based on the total weight of the electrolyte composition. Suitable modified viscosifying agents include film forming agents well known in the art which include, by way of example, polyethylene oxide, polypropylene oxide, copolymers thereof, and the like, having a number average molecular weight of at least about 100,000, which have been modified by the addition of a latent reactive group. Preferably, the modified viscosifying agent is employed in an amount of from about 1 to about 10 weight percent, and more preferably from about 2 to about 5 weight percent based on the total weight of the electrolyte composition.

The composition can be cured by conventional methods to form a solid film. For example, when the solid matrix forming monomer contains a reactive double bond, suitable curing methods include heating, irradiation with UV radiation, irradiation with electron beams (EB), and the like. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like. When curing is by UV radiation, the initiator is typically benzophenone, Darocur 1173 (Geigy, Ardlesy, N.Y.), and the like.

The initiator is generally employed in an amount sufficient to catalyze the polymerization reaction. Preferably, the initiator is employed at up to about 1 weight percent, based on the weight of the solid matrix forming monomer. When curing is by EB treatment, an initiator is not required.

In an alternative embodiment, the solid polymeric matrix, e.g., formed by polymerization of a solid martrix forming monomer, can be dissolved in a suitable volatile solvent and the requisite amounts of, for example, the inorganic ion salt, solvent mixture of an organic carbonate and a glyme and modified viscosifying agent are then added. The mixture can then be applied onto a suitable substrate, e.g., the surface of the cathode opposite to the current collector, an anode, interposed between an anode and a cathode, and the like, in the manner set forth above. The volatile solvent can be removed by conventional techniques and the composition cured, which should provide for a solid electrolyte. Suitable volatile solvents preferably have a boiling point of less than 85° C. and more preferably between about 45° C. and about 85° C. Particularly preferred volatile solvents are aprotic solvents. Examples of suitable volatile solvents include acetonitrile, tetrahydrofuran, and the like. However, acetonitrile is not preferred if it is to contact the anode.

The resulting solid electrolyte should be a homogeneous, single-phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors in mono-, di-, tri- and higher functional acrylate monomers as well as in the urethane acrylate prepolymers, are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with a composition comprising a solid matrix forming monomer, a salt, a solvent and a viscosifying agent containing a latent reactive group. The composition can then be cured to provide for a solid electrolyte on the cathodic surface. The anode, e.g., a lithium foil, can then be laminated to this composite product in such a way that the solid electrolyte is interposed between the lithium foil and the cathodic material. In this manner, the electrolyte can be covalently bonded to the surface of the cathode, to provide a solid electrolyte and electrolytic cell having improved mechanical properties.

In a further preferred embodiment, this process can be reversed, so that the surface of an anode, preferably a composite material, is coated with a composition comprising a solid matrix forming monomer, a salt, a solvent and a viscosifying agent containing a latent reactive group. The composition can then be cured to provide for a solid electrolyte on the anodic surface. The cathode can then be laminated to this composite product in such a way that the solid electrolyte is interposed between the composite anodic material and the cathodic material. In this manner, the electrolyte can be covalently bonded to the surface of the anode, to provide a solid electrolyte and electrolytic cell having improved mechanical properties.

In a further embodiment, the process of forming an electrolytic cell comprises the steps of interposing between the surfaces of a cathode and an anode, preferably a composite material, a composition comprising a solid matrix forming monomer, a salt, a solvent and a viscosifying agent containing a latent reactive group. The composition can then be cured to provide for a solid electrolyte interposed between the cathodic and anodic surface. In this manner, the electrolyte can be covalently bonded to the surfaces of both the anode and the cathode, to provide a solid electrolyte and electrolytic cell having improved mechanical properties.

Methods for preparing solid electrolytes and electrolytic cells are also set forth in U.S. Pat. Nos. 4,830,939 and 4,925,751 which are incorporated herein by reference in their entirety.

Utility

The present invention, in view of the discussion above, achieves the following:

The solid, solvent-containing electrolyte described herein is particularly useful in preparing a solid electrolyte wherein a modified viscosifying agent is covalently bonded to other components of the electrolyte and in preparing a solid electrolytic cell produced therefrom having improved performance, wherein the electrolyte is covalently bonded the cathode and/or anode.

The solid, solvent-containing electrolyte described herein is also particularly useful in preparing a solid electrolyte wherein the modified viscosifying agent is improved in thickening and wetting properties.

In addition, the solid, solvent-containing electrolyte described herein containing a modified viscosifying agent has improved mechanical properties which include an increased adherence to the cathode and/or anode which enables the preparation of a solid electrolytic cell wherein the laminate exhibits increased adherence of the electrolyte layer to the cathode layer and/or anode layer.

The following prophetic examples are offered to illustrate the present invention and should not be construed in any way as limiting its scope.

EXAMPLE 1

A. The Cathode

The cathode may be prepared from a cathodic paste which, in turn, may be prepared from a cathode powder as follows:

i. Cathode Powder

The cathode powder can be prepared by combining 90.44 weight percent $V_6O_{13}$ (prepared by heating ammonium metavanadate ($NH_4^+VO_3^-$) at 450° C. for 16 hours under N2 flow) and 9.56 weight percent of carbon (from Chevron Chemical Company, San Ramon, Calif. under the trade name of Shawinigan Black®). About 100 grams of the resulting mixture can be placed into a grinding machine (Attritor Model S-1 purchased from Union Process, Akron, Ohio) and ground for 45 minutes. Afterwards, the resulting mixture can be dried at about 260° C. for 16 hours under vacuum which should provide a cathode powder having about 84.45 weight percent $V_6O_{13}$.

The above mixing procedure can be repeated to provide for a total of 292 grams of cathode powder.

ii. Cathode Paste

A cathode paste may be prepared by combining sufficient cathode powder which should provide for a final product having 45 weight percent $V_6O_{13}$.

Specifically, about 26.2 grams of unground carbon (from Chevron Chemical Company, San Ramon, Calif. under the trade name of Shawinigan Black®) can be combined in a glove box (under dry (<10 ppm $H_2O$) argon at ambient temperature and pressure) with about 169.9 grams of a 4:1 w/w mixture of propylene carbonate/triglyme and the resulting composite mixed under dry argon and at ambient temperature and pressure on a double planatory mixer (Ross #2 mixer available from Charles Ross & Sons, Company, Hauppag, N.Y.) at about 25 rpms until a paste is formed.

About 225.0 grams of a cathode powder prepared in a manner similar to that described above can be added to the mixer along with an additional 169.9 grams of the 4:1 mixture of propylene carbonate/triglyme and the resulting composite can be mixed under dry argon and at ambient temperature and pressure on a double planatory mixer at about 25 rpms until a dry paste is formed.

About 5 grams of polyethylene oxide (number average molecular weight about 600,000 available as Polyox WSR-205 from Union Carbide Chemicals and Plastics, Danbury, Conn.), about 42.5 grams of polyethylene glycol diacrylate (molecular weight about 500 available as SR-344 from Sartomer Company, Inc., Exton, Pa.) and containing less than about 50 ppm of inhibitor, and about 7.5 grams of ethoxylated trimethylpropane triacrylate (TMPEOTA) (molecular weight about 425 available as SR-454 from Sartomer Company, Inc., Exton, Pa.) and containing less than about 50 ppm of inhibitor can be added to about 169.9 grams of a 4:1 mixture of propylene carbonate/triglyme and this mixture added to the mixer.

The resulting slurry in the mixer can be heated at about 65° C. while mixing for 2 hours at 60 rpms to provide for the cathodic paste which would have the following approximate weight percent of components:

| | |
|---|---|
| $V_6O_{13}$ | 45.00 weight percent |
| Carbon | 10.00 weight percent |
| propylene carbonate | 27.18 weight percent |
| Triglyme | 6.80 weight percent |
| Polyethylene glycol diacrylate | 8.51 weight percent |
| Ethoxylated trimethylpropane triacrylate[1] | 1.51 weight percent |
| Polyethylene oxide | 1.00 weight percent |

[1]Inhibitor may be removed from both the polyethylene glycol diacrylate and ethoxylated trimethylpropane triacrylate by contactig each of these compounds with an Inhibitor Remover available as Product No. 31,133-2 from Aldrich Chemical, Milwaukee, Wisconsin, which results in less than 50 ppm of inhibitor in the product.

In an alternative embodiment, the requisite amounts of all of the cathodic materials other than the cathode powder can be combined to form a first mixture and this first mixture is combined with the cathode powder to form a second mixture. This second mixture can be then thoroughly mixed to provide for the cathode paste.

The cathode paste which can be prepared as above can be placed onto a sheet (about 1 mil (N-25 μm) thick by 10 cm wide) of a roughened nickel on nickel current collector (available as CF18/NiT from Fukuda Metal Foil & Powder Company, Ltd., Kyoto, Japan). A Mylar cover sheet can then be placed over the paste and the paste spread to a thickness of about 75 microns (μm) with a conventional plate and roller system and cured by continuously passing the sheet through an electron beam apparatus (Electrocurtain, Energy Science Inc., Wolburn, Mass.) at a voltage of about 175 kV and a current of about 12 mA and at a conveyor belt speed setting of 50 which provides a conveyor speed of about 3 in/sec. After curing, the Mylar sheet can be removed which should provide for a solid cathode laminated to a nickel on nickel current collector.

B. Electrolyte

The electrolyte may be prepared by first combining 56 grams of propylene carbonate, 14 grams of triglyme and 17 grams of urethane acrylate (available as Photomer 6140 from Henkel Corporation, Coating and Chemicals Division, Ambler, Pa.). The propylene carbonate/triglyme/urethane acrylate mixture can be dried over molecular sieves (Grade 514, 4 Å, 8–12 mesh, available from W. R. Grace, Baltimore, Md.) to remove water.

This solution can then be combined with 3 grams of modified polyethylene oxide* (average molecular weight about 600,000 available from Bio-Metric Systems, Inc., Eden Prairie, Minn.). The mixture can then be thoroughly mixed with the same laboratory mixer at heating until a temperature of about 65° C. is reached and then cooled to ambient temperature over at least a 2 hour period while stirring is maintained.

Once the modified polyethylene oxide* is dispersed and dissolved, 4 grams of $LiAsF_6$ (available from FMC Corporation Lithium Division, Bessemer City, N.C., as Lectrosalt®) and 5 grams of $Li(OCH_2CH_2)_3OCH_3$ can be added while stirring with a laboratory mixer (Yamato Model LR41B, available from Fisher Scientific, Santa Clara, Calif.). The $Li(OCH_2CH_2)_3OCH_3$ salt can be prepared from a 1:1 molar ratio n-butyl lithium and the monomethylether of triethylene glycol in tetrahydrofuran at −78° C. Other aprotic solvents could also be used.

The resulting 100 gram mixture would contain the following weight percent of components:

| | |
|---|---|
| Propylene carbonate | 57 weight percent |
| Triglyme | 14 weight percent |
| Urethane acrylate (Photomer 6140) | 17 weight percent |
| $LiAsF_6$ | 4 weight percent |
| $Li(OCH_2CH_2)_3OCH_3$ | 5 weight percent |
| Polyethylene oxide* | 3 weight percent. |

Afterwards, the electrolyte mixture can then be coated by a conventional knife blade to a thickness of about 50 μm onto the surface of the cathode sheet prepared as above (on the side opposite that of the current collector) but without the Mylar covering. The electrolyte can then be cured by continuously passing the sheet through an electron beam apparatus (Electrocurtain, Energy Science Inc., Wolburn, Mass.) at a voltage of about 175 kV and a current of about 1.0 mA and at a conveyor speed setting of 50 which provides for a conveyor speed of about 1 cm/sec. After curing, a composite is recovered which should contain a solid electrolyte laminated to a solid cathode which, in turn, is laminated to a nickel on nickel current collector.

C. Anode

The anode may comprise a sheet of lithium foil (about 76 μm thick) which is commercially available from FMC Corporation Lithium Division, Bessemer City, N.C.

D. The Solid Battery

A solid battery may be prepared by first preparing a cathodic paste as described above which can be spread onto a substrate, e.g., a current collector, and then cured to provide the cathode. An electrolyte composition as described above can then be placed onto the cathode surface and cured to provide for the solid electrolyte. Then, the anode can be laminated onto the solid electrolyte to provide for the solid battery.

EXAMPLE 2

A solid electrolytic cell can be prepared by first preparing a cathodic paste which is spread onto a current collector and cured to provide for the cathode. An electrolyte solution can be placed onto the cathode surface and cured to provide for the solid electrolyte composition. Then, the anode can be laminated onto the solid electrolyte composition to provide for a solid electrolytic cell. The specifics of this construction are as follows:

A. The Current Collector

The current collector is a sheet of aluminum foil having a layer of adhesion promoter attached to the surface of the foil which should contact the cathode so as to form a composite having a sheet of aluminum foil, a cathode and a layer of adhesion promoter interposed therebetween.

Specifically, the adhesion promoter layer can be prepared as a dispersed colloidal solution by one of two methods. The first preparation of this colloidal solution for this example can be as follows:

84.4 weight percent of carbon powder (Shawinigan Black™—available from Chevron Chemical Company, San Ramon, Calif.)

337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)

578.0 weight percent of isopropanol

The carbon powder and isopropanol can be combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid can be added to the solution and mixed for approximately 15 minutes. The resulting mixture can be pumped to the coating head and roll coated with a Meyer rod onto a sheet of aluminum foil (about 9 inches wide and about 0.0005 inches thick). After application, the solution/foil can be contacted with a Mylar wipe (about 0.002 inches thick by about 2 inches and by about 9 inches wide—the entire width of aluminum foil). The wipe can be flexibly engaged with the foil, i.e., the wipe contacts the foil, to redistribute the solution so as to provide for a substantially uniform coating. Evaporation of the solvents, i.e., water and isopropanol, via a conventional gas-fired oven can provide for an electrically conducting adhesion-promoter layer of about 6 microns in thickness or about $3\times10^{-4}$ grams per cm$^2$. The aluminum foil can be cut to about 8 inches wide by removing approximately ½ inch from either side by the use of a conventional slitter so as to remove any uneven edges.

In order to further remove the protic solvent from this layer, the foil can be redried. In particular, the foil can be wound up and a copper support can be placed through the roll's cavity. The roll can be hung overnight from the support in a vacuum oven maintained at about 130° C. Afterwards, the roll can be removed. In order to avoid absorption of moisture from the atmosphere, the roll can be preferably stored in a desiccator or other similar anhydrous environment to minimize atmospheric moisture content until the cathode paste is ready for application onto this roll.

The second preparation of this colloidal solution can comprise mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring can be done in a 30 gallon polyethylene drum with a gear-motor mixer, e.g., Lightin Labmaster Mixer, model XJ-43, available from Cole-Parmer Instruments Co., Niles, Ill., at 720 rpm with two 5 inch diameter A310-type propellers mounted on a single shaft. This procedure can wet down the carbon and eliminate any further dust problem. The resulting weight of the mixture should be about 143.5 lbs and contain some "lumps".

The mixture can be further mixed with an ink mill which consists of three steel rollers almost in contact with each other, turning at 275, 300, and 325 rpms, respectively. This high shear operation allows particles that are sufficiently small to pass directly through the rollers. Those that do not pass through the rollers can continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) should indicate that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol can be mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). The composition can be gear pumped through a 25 μm cloth filter, e.g., So-Clean Filter Systems, American Felt and Filter Company, Newburgh, N.Y., and Meyer-rod coated as described above.

B. The Cathode

The cathode can be prepared from a cathodic paste which, in turn, can be prepared from a cathode powder as follows:

i. Cathode Powder

The cathode powder can be prepared by combining 90.44 weight percent $V_6O_3$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black™). About 100 grams of the resulting mixture can be placed into a grinding machine (Attritor Model S-1 purchased from Union Process, Akron, Ohio) and ground for 30 minutes. Afterwards, the resulting mixture can be dried at about 260° C. for 21 hours.

ii. Cathode Paste

A cathode paste can be prepared by combining sufficient cathode powder which should provide for a final product having 45 weight percent $V_6O_{13}$.

Specifically, 171.6 grams of a 4:1 weight ratio of propylene carbonate:triglyme can be combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y).

A propeller mixture can be inserted into the double planetary mixer and the resulting mixture can be stirred at 150 rpms until homogeneous. The resulting solution can be passed through sodiated 4 Å molecular sieves. The solution can be returned to a double planetary mixer equipped with the propeller mixer and about 5 grams of polyethylene oxide (number average molecular weight about 600,000 available as Polyox WSR-205 from Union Carbide Chemicals and Plastics, Danbury, Conn.) can be added to the solution vortex by a mini-sieve such as a 25 mesh mini-sieve commercially available as Order No. 57333-965 from VWR Scientific, San Francisco, Calif.

The solution can be heated while stirring until the temperature of the solution reaches 65° C. At this point, stirring can be continued until the solution is completely clear. The propeller blade can be removed and the carbon powder prepared as above can be added as well as an additional 28.71 grams of unground carbon (from Chevron Chemical Company, San Ramon, Calif. under the tradename of Shawinigan Black™). The resulting mixture can be mixed at a rate of 7.5 cycles per second for 30 minutes in the double planetary mixer. During this mixing the temperature can slowly increase to a maximum of 73° C. At this point, the mixing can be reduced to 1 cycle per second and the mixture can be slowly cooled to a temperature of from 40° C. to 48° C., e.g., about 45° C. The resulting cathode paste can be maintained at this temperature until just prior to application onto the current collector.

The resulting cathode paste can have the following approximate weight percent of components:

| | |
|---|---|
| $V_6O_{13}$ | 45 weight percent |
| Carbon | 10 weight percent |
| 4:1 propylene carbonate/tri-glyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components can be added directly to the combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated should have a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES", now abandoned which application is incorporated herein by reference in its entirety.

The cathode paste noted above can be placed onto the adhesion layer of the current collector described above by extrusion at a temperature of from about 45° to about 48° C. A Mylar cover sheet can be placed over the paste and the paste can be spread to a thickness of about 90 microns (µm) with a conventional plate and roller system and can be cured by continuously passing the sheet through an electron beam apparatus (Electro-curtain, Energy Science Inc., Woburn, Mass.) at a voltage of about 175 kV and a current of about 1.0 mA and at a rate of about 1 cm/sec. After curing, the Mylar sheet can be removed to provide for a solid cathode laminated to the aluminum current collector described above.

C. Electrolyte 56 grams of propylene carbonate, 14 grams of triglyme, and 17 grams of urethane acrylate (Photomer 6140, available from Henkel Corp., Coating and Chemical Division, Ambler, Pa.) can be combined at room temperature until homogeneous. The resulting solution can be passed through a column of 4 Å sodiated molecular sieves to remove water and then can be mixed at room temperature until homogeneous.

At this point, 4 grams of modified polyethylene oxide* having a number average molecular weight of about 600,000 (available from Bio-Metric Systems, Inc., Eden Prairie, Minn.) can be added to the solution and then dispersed while stirring with a magnetic stirrer over a period of about 120 minutes. After dispersion, the solution can be heated to between 60° C. and 65° C. with stirring until the viscosifying agent dissolves. The solution can be cooled to a temperature of between 45° and 48° C., a thermocouple can be placed at the edge of the vortex created by the magnetic stirrer to monitor solution temperature, and then 9 grams of $LiPF_6$ can be added to the solution over a 120 minute period while thoroughly mixing to ensure a substantially uniform temperature profile throughout the solution. Cooling can be applied as necessary to maintain the temperature of the solution between 45° and 48° C.

In one embodiment, the modified polyethylene oxide* can be added to the solution via a mini-sieve such as a 25 mesh mini-sieve commercially available as Order No. 57333-965 from VWR Scientific, San Francisco, Calif.

The resulting solution should contain the following:

| Component | Amount | Weight Percent[a] |
|---|---|---|
| Propylene Carbonate | 56 g | 56 |
| Triglyme | 14 g | 14 |
| Urethane Acrylate | 17 g | 17 |
| $LiPF_6$ | 9 g | 9 |
| PEO* | 4 g | 4 |
| Total | 100 g | 100 |

[a]weight percent based on the total weight of the electrolyte solution (100 g)

This solution can be degassed to provide for an electrolyte solution wherein little, if any, of the $LiPF_6$ salt decomposes.

Optionally, solutions which can be produced as above and which contain the prepolymer, the polyethylene oxide viscosifying agent, the electrolyte solvent and the $LiPF_6$ salt can be filtered to remove any solid particles or gels remaining in the solution. One suitable filter device is a sintered stainless steel screen having a pore size between 1 and 50 µm at 100% efficiency.

Alternatively, the electrolyte solution can be prepared in the following manner. Specifically, in this example, the mixing procedure can be conducted using the following weight percent of components:

| | |
|---|---|
| Propylene Carbonate | 52 weight percent |
| Triglyme | 13 weight percent |
| Urethane Acrylate[b] | 20 weight percent |
| $LiPF_6$ | 10 weight percent |
| PEO[c] | 5 weight percent |

[b](Photomer 6140, available from Henkel Corp., Coating and Chemical Division, Ambler, PA)
[c]modified polyethylene oxide having a number average molecular weight of about 600,000 (from Bio-Metric Systems, Inc., Eden Prairie, MN)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4 Å molecular sieves (Grade 514, 8–12 Mesh from Schoofs Inc., Moraga, Calif.) and then proceed to step 4.

2. Dry the propylene carbonate and triglyme over sodiated 4 Å molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the modified polyethylene oxide through a 25 mesh mini-sieve commercially available as Order No. 57333-965 from VWR Scientific, San Francisco, Calif. While stirring at 300 rpm, add the dried and pre-sifted modified polyethylene oxide slowing to the solution. The modified polyethylene oxide should be sifted into the center of the vortex formed by the stirring means over a 30 minute period. Addition of the modified polyethylene oxide should be dispersive and, during addition, the temperature should be maintained at room temperature (<30° C.).

5. After final addition of the modified polyethylene oxide, stir an additional 30 minutes to ensure that the viscosifying agent is substantially dispersed.

6. Heat the mixture to 68° C. to 75° C. and stir until the viscosifying agent has melted and the solution has become transparent to light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C.

8. After the final addition of the $LiPF_6$ salt, stir for an additional 30 minutes, degas, and let sit overnight and cool.

9. Filter the solution through a sintered stainless steel screen having a pore size between 1 and 50 µm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 µm onto the surface of the cathode sheet prepared as above (on the side opposite that of the current collector) but without the Mylar covering. The electrolyte should be cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite can be recovered which contains a solid electrolyte laminated to a solid cathode.

D. Anode

The anode can comprise a sheet of lithium foil (about 76 µm thick) which is commercially available from FMC Corporation Lithium Division, Bessemer City, N.C.

E. The Solid Electrolytic Cell

A sheet comprising a solid battery can be prepared by laminating the lithium foil anode to the surface of the electrolyte in the sheet produced in step C above. Lamination can be accomplished by minimal pressure.

What is claimed is:

1. An electrolyte precursor for an electrolytic cell which comprises:
   a solid matrix forming monomer;
   a salt;
   a solvent; and
   a viscosifying agent containing a latent reactive group which covalently bonds to a polymeric matrix or the solvent of said electrolyte precursor upon curing.

2. The electrolyte precursor of claim 1, wherein the latent reactive group is a photochemically reactive group.

3. The electrolyte precursor of claim 1, wherein the latent reactive group is a thermochemically reactive group.

4. The electrolyte precursor of claim 1, having from about 5 to about 25 weight percent salt, based on the total weight of the electrolyte composition.

5. The electrolyte precursor of claim 1, having from about 40 to about 80 weight percent solvent, based on the total weight of the electrolyte composition.

6. The electrolyte precursor of claim 1, having from about 5 to about 30 weight percent solid matrix forming monomer, based on the total weight of the electrolyte composition.

7. The electrolyte precursor of claim 1, having from about 1 to about 15 weight percent viscosifying agent having a latent reactive group, based on the total weight of the electrolyte composition.

8. The electrolyte precursor of claim 7, wherein said viscosifying agent containing a latent reactive group is present in an amount of from about 1 to about 10 weight percent, based on the total weight of the electrolyte composition.

9. The electrolyte precursor of claim 8, wherein said viscosifying agent containing a latent reactive group is present in an amount of from about 2 to about 5 weight percent, based on the total weight of the electrolyte composition.

10. The electrolyte precursor of claim 1, wherein said viscosifying agent containing a latent reactive group is polyethylene oxide containing a benzophenone group.

11. A solid electrolyte which is a cured reaction product of the electrolyte precursor composition of claim 1, wherein the viscosifying agent is covalently bonded to a polymeric matrix or the solvent of the electrolyte.

12. The solid electrolyte of claim 11, wherein the cured electrolyte has a thickness of from about 20 to about 250 microns.

13. A solid, single-phase, solvent-containing electrolyte which comprises:
   a solid polymeric matrix;
   a salt;
   a solvent; and
   a viscosifying agent containing a reactive group, wherein said viscosifying agent is covalently bonded to the solid polymeric matrix or the solvent of the electrolyte.

14. An electrolytic cell which comprises:
   an anode containing a composite anodic material;
   a cathode containing a compatible cathodic material; and
   interposed therebetween a solid, solvent-containing electrolyte which comprises:
      a solid polymeric matrix;
      a salt;
      a solvent; and
      a viscosifying agent containing a reactive group, wherein said viscosifying agent is covalently bonded to the solid polymeric matrix or the solvent of the solid electrolyte.

15. The electrolytic cell of claim 14, wherein the solid electrolyte is covalently bonded to the anode.

16. The electrolytic cell of claim 14, wherein the solid electrolyte is covalently bonded to the cathode.

17. The electrolytic cell of claim 14, wherein the solid electrolyte is covalently bonded to the cathode and the anode.

18. A process for preparing a solid electrolyte for an electrolytic cell which comprises:
   (a) providing an electrolyte composition comprising:
      a solid matrix forming monomer,
      a salt,
      a solvent, and
      a viscosifying agent containing a latent reactive group;
   (b) curing said electrolyte composition so as to activate the latent reactive group to covalently bond the viscosifying agent to the solid polymeric matrix or the solvent of the electrolyte to provide a solid electrolyte.

19. A process for preparing a solid electrolyte for an electrolytic cell which comprises:

(a) polymerizing a solid matrix forming monomer to form a solid polymeric matrix;

(b) dissolving said solid polymeric matrix in a suitable volatile solvent;

(c) adding a salt, a suitable electrolyte solvent and a viscosifying agent containing a latent reactive group to the dissolved polymeric matrix to form an electrolyte composition; and (d) removing said volatile solvent and curing said electrolyte composition so as to activate the latent reactive group to covalently bond the viscosifying agent to the solid polymeric matrix or the solvent of the electrolyte to provide a solid electrolyte.

20. A process for preparing an electrolytic cell which comprises:

(a) providing a cathode containing a compatible cathodic material;

(b) coating a surface of the cathode with an electrolyte composition comprising:
a solid matrix forming monomer,
a salt,
a solvent, and
a viscosifying agent containing a latent reactive group;

(c) curing said electrolyte composition so as to activate the reactive group to covalently bond the viscosifying agent to the cathode and to the solid polymeric matrix, or the solvent of the electrolyte to provide a solid electrolyte covalently bonded to the cathodic surface; and (d) laminating an anode containing a compatible anodic material to said solid electrolyte such that the solid electrolyte is interposed between the anode and the cathode.

21. A process for preparing an electrolytic cell which comprises:

(a) providing an anode containing a composite anodic material;

(b) coating a surface of the anode with an electrolyte composition comprising:
a solid matrix forming monomer,
a salt,
a solvent, and
a viscosifying agent containing a latent reactive group;

(c) curing said electrolyte composition so as to activate the reactive group to covalently bond the viscosifying agent to the anodic surface and to the solid polymeric matrix or the solvent of the electrolyte to provide a solid electrolyte covalently bonded to the anodic surface; and (d) laminating an cathode containing a compatible cathodic material to said solid electrolyte such that the solid electrolyte is interposed between the anode and the cathode.

22. A process for preparing an electrolytic cell which comprises:

(a) providing an anode containing a composite anodic material;

(b) providing a cathode containing a compatible cathodic material;

(c) interposing between surfaces of the cathode and the anode an electrolyte composition comprising:
a solid matrix forming monomer,
a salt,
a solvent, and
a viscosifying agent containing a latent reactive group; and (d) curing said electrolyte composition so as to activate the reactive group to covalently bond the viscosifying agent to the surfaces of the anode and cathode and to the solid polymeric matrix or the solvent of the electrolyte to provide a solid electrolyte covalently bonded to the surfaces of both the anode and cathode.

* * * * *